(12) United States Patent
Sabry et al.

(10) Patent No.: US 10,922,468 B1
(45) Date of Patent: Feb. 16, 2021

(54) GENEALOGY DRIVEN IC LAYOUT GENERATOR AND CLASSIFICATION METHOD

(71) Applicant: Mentor Graphics Corporation, Wilsonville, OR (US)

(72) Inventors: Mohamed-Nabil Sabry, Cairo (EG); Kareem Madkour, Cairo (EG); Sherif Ahmed Abdel-Wahab Hammouda, Cairo (EG)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 16/551,071

(22) Filed: Aug. 26, 2019

(51) Int. Cl.
*G06F 30/392* (2020.01)
*G06F 30/398* (2020.01)
*G06F 111/20* (2020.01)

(52) U.S. Cl.
CPC .......... *G06F 30/392* (2020.01); *G06F 30/398* (2020.01); *G06F 2111/20* (2020.01)

(58) Field of Classification Search
USPC ........................................................ 716/112
See application file for complete search history.

(56) References Cited

U.S. PATENT DOCUMENTS

2002/0166103 A1* 11/2002 Rittman ................ G06F 30/398 716/52
2018/0121594 A1* 5/2018 Studders .................. G06F 30/33
2019/0340326 A1* 11/2019 Huda ................... H01L 27/0207

OTHER PUBLICATIONS

H. Li et al, "Design space exploration for early identification of yield limiting patterns", Proc. of SPIE vol. 9781 97810W-1, 2016, San Jose, CA, 9 pgs.
Ji Xu et al., "Design Layout Analysis and DFM Optimization using Topological Patterns", Proc. of SPIE vol. 9427 94270Q-1, 2015, San Jose, CA, 12 pgs.
Kuan-Jung Chen et al., "Minimizing Cluster Number with Clip Shifting in Hotspot Pattern Classification", DAC '17, Jun. 18-22, 2017, Austin, TX, USA, pp. 1-7.
Yan-Shiun Wu et al., "MapReduce-Based Pattern classification for Design Space Analysis", 2018 International Symposium on VLSI Design, Automation and Test (VLSI-DAT), 2018, pp. 1-4.
Atsushi Takahashi et al., "Pattern Similarity Metrics for Layout Pattern Classification and their Validity Analysis by Lithographic Responses", 2018 IEEE Computer Society Annual Symposium on VLSI, Jul. 2018, pp. 1-4.

* cited by examiner

*Primary Examiner* — Mohammed Alam (57) ABSTRACT

Systems and methods for systems and methods for generating the complete set of IC design layout clips, or any part of the complete set, satisfying usefulness criteria and of a prespecified size. A method includes generating an initial set of integrated circuit (IC) design layout clips as a current set of IC design layout clips. The method includes removing any of IC design layout clips from the current set of IC design layout clips that do not meet the one or more usefulness criteria. The method includes, while a size of the IC design layout clips is less than a desired clip size, generating a new set of IC design layout clips from the current set of IC design layout clips according to every combination of pairs of the design layout clips in the current set of IC design layout clips, and repeating the removing process. The method includes, when the size of the IC design layout clips is not less than the desired clip size, storing the current set of IC design layout clips as a final set of IC design layout clips.

14 Claims, 6 Drawing Sheets

| DESIGNATION | SEQUENCE | TYPICAL SHAPE | ALIAS |
|---|---|---|---|
| $G_{0,1}$ | 802 | | RECTANGLE |

FIG. 8A

| DESIGNATION | SEQUENCE | TYPICAL SHAPE | ALIAS |
|---|---|---|---|
| $G_{1,1}$ | 806 | | L-SHAPED |

FIG. 8B

| DESIGNATION | SEQUENCE | TYPICAL SHAPE | ALIAS |
|---|---|---|---|
| $G_{2,1}$ | | | U-SHAPED |
| $G_{2,2}$ | | | 3-STEP LADDER |
| $G_{2,3}$ | | | T-SHAPED |
| $G_{2,4}$ | 804 | | S-SHAPED |

GENEALOGY DRIVEN IC LAYOUT GENERATOR AND CLASSIFICATION METHOD

TECHNICAL FIELD

The disclosed technology is directed techniques for circuit design, testing, and manufacture.

BACKGROUND OF THE DISCLOSURE

The rapidly growing area of automatically generated integrated circuit (IC) designs for different layers of a semiconductor chip requires suitable analysis and qualification tools. One daunting issue is that the set of different designs to be analyzed is extremely large. To illustrate this, consider a single layer and a small building block of a design of 200×200 nm size. As used herein, the building block of a specified size may be referred to as a "clip."

If the minimum addressable size is 1 nm, the area can be viewed as a figure containing 200×200 pixels, each can be either black or white, representing either a conductive area/path (black) or a non-conductive area (white). Theoretically, there are $2^{(200 \times 200)} = 1.58e12041$ possible designs. Of course, not all possible distributions of pixels are eligible as a valid design. A given design should satisfy design rules, e.g., it should satisfy "design rules checker" (DRC) requirements to ensure it can be successfully manufactured using a given manufacturing process. Still, the set of all eligible distributions of pixels is very large. Automated analysis and qualification tools are desirable.

SUMMARY OF THE DISCLOSURE

Various disclosed embodiments include systems and methods for generating a set of IC design layout clips. The generated set can be the complete set of all IC design layout clips that satisfy user specified usefulness criteria, or any part of this complete set, and are of a predetermined desired clip size. A method includes generating an initial set of IC design layout clips as a current set of IC design layout clips. The method includes removing any of IC design layout clips from the current set of IC design layout clips that do not meet the one or more usefulness criteria. The method includes, while a size of the IC design layout clips is less than a desired clip size, generating a new set of IC design layout clips from the current set of IC design layout clips according to every combination of each pair of the design layout clips in the current set and repeating the removing process. Each pair of the design layout clips in the current set can include all possible rotations and/or reflections of each design layout clip before combination. The new set of IC design layout clips can be considered as the current set before repeating the removing process. The method includes, when the size of the IC design layout clips is not less than the desired clip size, storing the current set of IC design layout clips as a final set of IC design layout clips, which can be all possible IC design layout clips satisfying usefulness criteria and of the desired clip size, or can be some part of all of the possible IC design layout clips. The method can include storing clip ancestor data for each of the IC design layout clips in the final set of IC design layout clips.

Disclosed embodiments also include a computer system having a processor and an accessible memory, configured to perform processes as disclosed herein. Disclosed embodiments also include one or more non-transitory computer-readable media storing executable instructions that, when executed, cause one or more computer systems to perform processes as disclosed herein.

In various embodiments, the usefulness criteria include one or more of satisfaction of design rule checker requirements, uniqueness, and engineering or manufacturing practicality. In various embodiments, the usefulness criteria include uniqueness, each IC design layout clip includes one or more polygons, and, to determine whether any of IC design layout clips from the current set of IC design layout clips that do not meet the one or more usefulness criteria, the computer system determines a Manhattan shape signature (MSS) for each polygon in each IC design layout clip in the current set of IC design layout clips, applies classification criteria to each IC design layout clip in the set of IC design layout clips to produce a fingerprint corresponding to each IC design layout clip in the set of IC design layout clips. and compares each pair of clips having a same corresponding fingerprint to identify non-unique IC design layout clips.

In various embodiments, the classification criteria includes one or more of a total number of polygons in an IC design layout clip, a number of edges of each polygon, the MSS of each polygon, a polygon area of each polygon, a polygon perimeter of each polygon, a ratio of longest edge to shortest edge of each polygon, a minimum distance between each polygon and its clip border, a distance between a center of gravity of each polygon and its IC design layout clip, or a distance between a center of gravity of pairs of polygons in a IC design layout clip. In various embodiments, each IC design layout clip in the set of IC design layout clips contains any number of polygons. In various embodiments, all IC design layout clips in the set of IC design layout clips comprise Manhattan polygons. Various embodiments also include thereafter manufacturing an IC according to the final set of IC design layout clips. Various embodiments also include receiving the desired clip size or receiving the one or more usefulness criteria.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

The Figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

As described above, automated analysis and qualification tools are desirable. In addition, in order to use tools outcome to make any educated decision. Disclosed embodiments include techniques for generating a design set of clips and classifying the design set to be analyzed in a hierarchic manner.

Illustrative Operating Environment

The execution of various processes described herein may be implemented using computer-executable software instructions executed by one or more programmable computing devices. Because these processes may be implemented using software instructions, the components and operation of a generic programmable computer system on which various embodiments of these processes may be employed will first be described. Further, because of the complexity of some electronic design and testing processes and the large size of many circuit designs, various electronic design and testing tools are configured to operate on a computing system capable of simultaneously running multiple processing threads. The components and operation of a computer system having a host or master computer and one or more remote or slave computers therefore will be described with reference to FIG. 1. This operating environment is only one example of a suitable operating environment, however, and is not intended to suggest any limitation as to the scope of use or functionality of any implementations of the invention.

Figure 1:
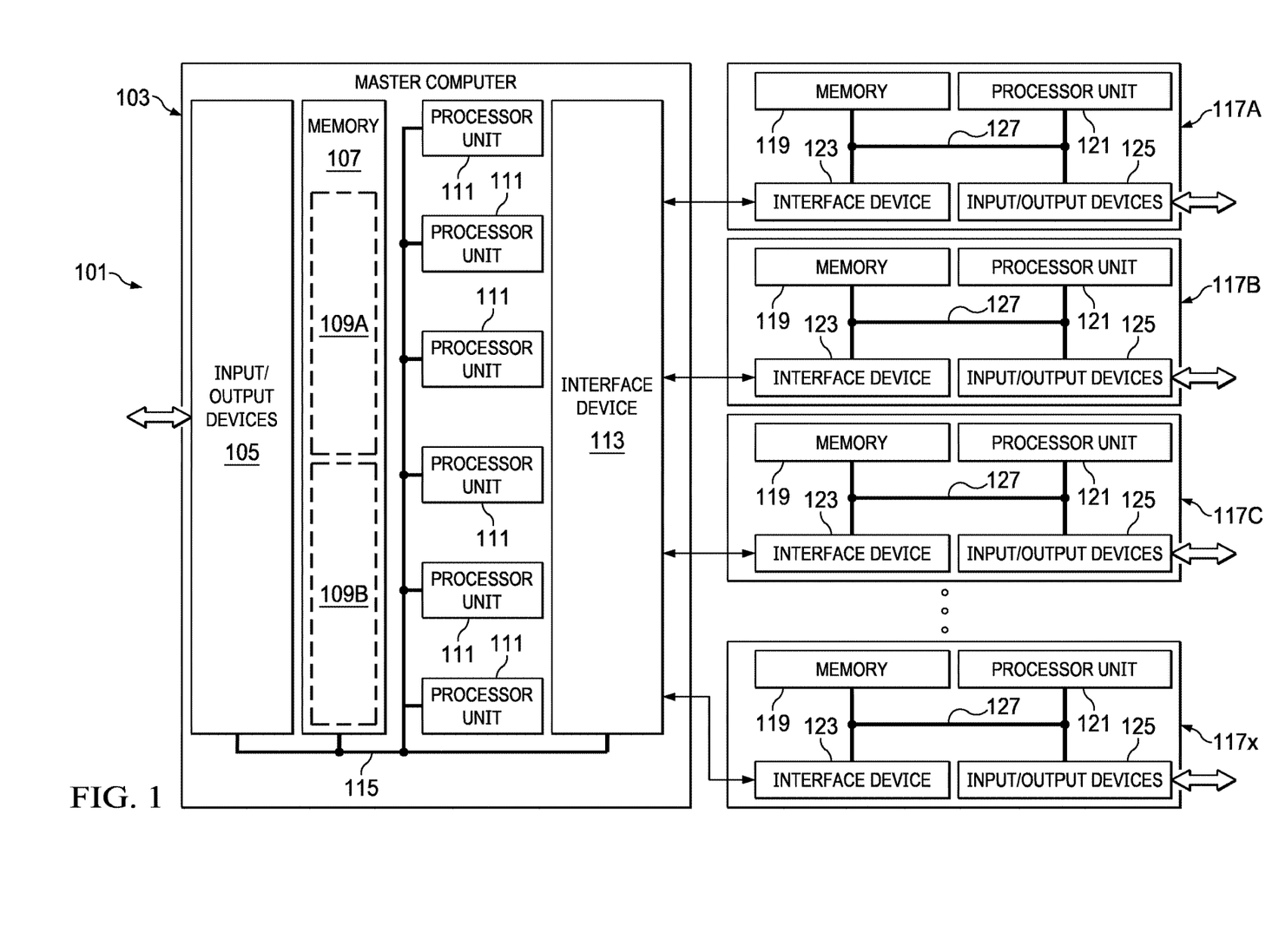
FIGS. 1 and 2 illustrate components of a computer system that may be used to implement various embodiments of the disclosed technology.

In FIG. 1, the computer system 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other non-transitory storage medium that can be used to store desired information. As used herein, the term "non-transitory" refers to the ability to store information for subsequent retrieval at a desired time, as opposed to propagating electromagnetic signals.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
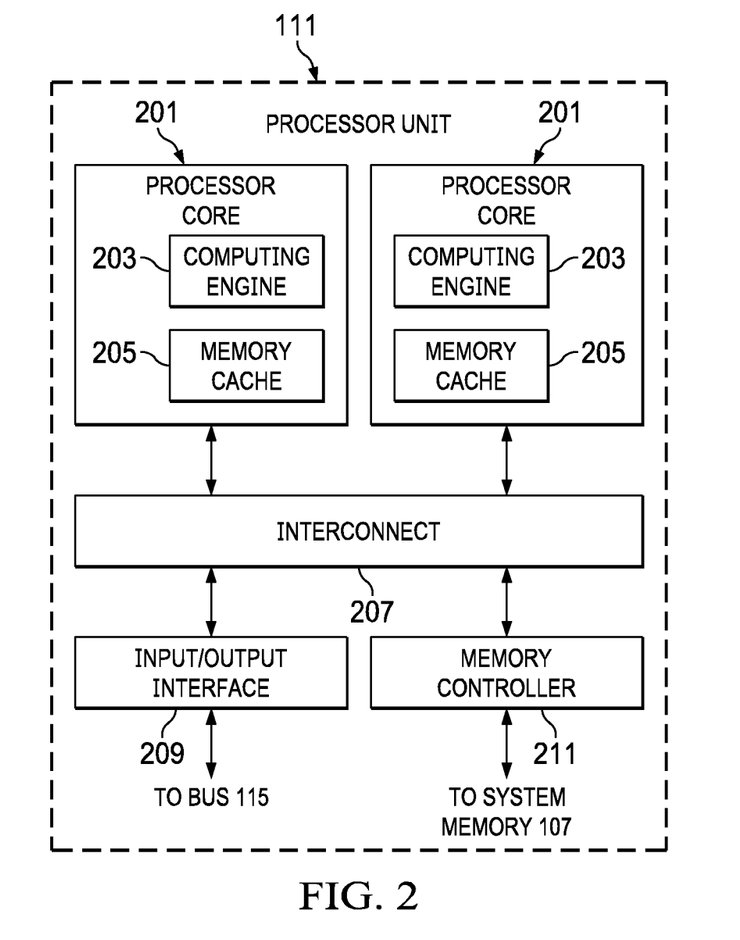

With some implementations of the invention, the master computer 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interfaces 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only and is not intended to be limiting. It also should be appreciated that, with some implementations, a multi-core processor unit 111 can be used in lieu of multiple, separate processor units 111. For example, rather than employing six separate processor units 111, an alternate implementation of the computing system 101 may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the slave computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the slave computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each slave computer 117 may include a memory 119, a processor unit 121, an interface device 123, and, optionally, one more input/output devices 125 connected together by a system bus 127. As with the master computer 103, the optional input/output devices 125 for the slave computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel®. Pentium®. or Xeon™ microprocessors, Advanced Micro Devices Athlon™ microprocessors or Motorola 68K/Coldfire®. microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. The memory 119 then may be implemented using any combination of the computer readable media discussed above. Like the interface device 113, the interface devices 123 allow the slave computers 117 to communicate with the master computer 103 over the communication interface.

In the illustrated example, the master computer 103 is a multi-processor unit computer with multiple processor units 111, while each slave computer 117 has a single processor unit 121. It should be noted, however, that alternate implementations of the technology may employ a master computer having single processor unit 111. Further, one or more of the slave computers 117 may have multiple processor units 121, depending upon their intended use, as previously discussed. Also, while only a single interface device 113 or 123 is illustrated for both the master computer 103 and the slave computers, it should be noted that, with alternate embodiments of the invention, either the computer 103, one or more of the slave computers 117, or some combination of both may use two or more different interface devices 113 or 123 for communicating over multiple communication interfaces.

With various examples of the computer system 101, the master computer 103 may be connected to one or more external data storage devices. These external data storage devices may be implemented using any combination of non-transitory computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the computer system 101, one or more of the slave computers 117 may alternately or additions be connected to one or more external non-transitory data storage devices. Typically, these external non-transitory data storage devices will include data storage devices that also are connected to the master computer 103, but they also may be different from any data storage devices accessible by the master computer 103.

It also should be appreciated that the description of the computer system 101 illustrated in FIG. 1 and FIG. 2 is provided as an example only, and it not intended to suggest any limitation as to the scope of use or functionality of various embodiments of the invention.

An overall integrated circuit design is constructed from many of the clip building blocks, and automated design tools attempt to automatically generate and categorize clip patterns for use in the design. Categorization or classification can be important, for example to be able to perform pattern recognition to remove problematic patterns from the generated set of clips, based on design rules or other criteria. Efficient processes for generating clips, categorizing or classifying them, and eliminating problematic clips improve the design process.

Figure 3A:
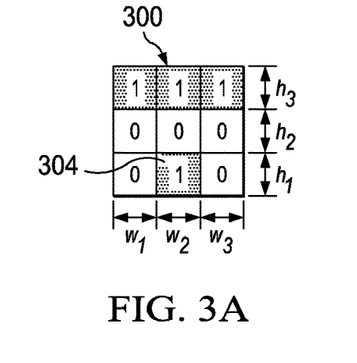
FIG. 3A illustrates a topological pattern represented by a bitmap.
Figure 3B:
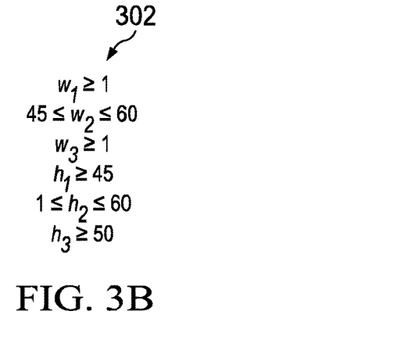
FIG. 3B illustrates a vector of constraints that can be used to define the bitmap in accordance with disclosed embodiments.

Some approaches use topological patterns where the clip is subdivided into a coarse mesh of rectangles. Each rectangle is fully composed of pixels of the same color (black or white), and the pattern of black and white pixels forms the topological pattern. Rectangle sides are not fixed. This way, each distribution of black and white rectangles may correspond to a whole category of actual designs when combined with other clips. FIG. 3A illustrates a topological pattern represented by a bitmap 300, and FIG. 3B illustrates a vector of constraints 302 that can be used to define the bitmap 300. Note that, in the Figures, the "black" portions are illustrated with a patterned fill rather than as a solid black color for better reproduction.

This approach is limited as a categorization methodology. For instance, if the black rectangle 304 at the bottom line was on the right or on the left, instead of being at the center, this would represent three different categories, although they are obviously related by all including the top set of black rectangles. A better solution is to have a super category grouping the three cases, which can be subdivided into three sub-categories, but such a solution is not addressed in this approach.

One approach includes randomly generating a set of clips that satisfy DRC rules. This is followed by characterization of clips. If a "problematic" clip (also called hot spot) is detected, another process generates variations of this hotspot clip to populate a database of problematic clips. The database of problematic clips is then used by the DRC as design-forbidden patterns. However, because these patterns are randomly generated, only some lesser portion of the entire set of possible patterns is considered.

Another approach includes producing all possible patterns having a small number of pixels, followed by a filtration process. This approach is limited to clips that are at most 4×4, for instance, which gives rise to $2^{(4\times4)}=65,536$ possible patterns. In this approach, larger patterns (e.g., larger than 4×4) quickly become unmanageable.

Moreover, generating a relatively larger number of clips may require some form of clip classification in order to efficiently handle, process, or evaluate the designs. In some cases, clips are treated in their raster form. A coarse grid structure of pixels is formed, each coarse pixel is usually bigger than actual design resolution. To each coarse pixel (which may cover many actual smaller pixels), it is possible to attribute a value. The value may be either black or white. It may sometimes be a gray scale, sometimes referred to as the "density" of smaller actual pixels in a given coarse pixel. The whole matrix of coarse pixels is used to identify clip type. The notion of a "distance" between two clip types is introduced to decide whether they are similar (small distance) or not. Proximity criteria can include whether polygons in both clips are almost of same area, whether edges of polygons are only slightly shifted, or whether the distance between norms of double Fourier transform of both clips is small, etc. These criteria are all relatively difficult and resource-intensive to calculate as compared to disclosed embodiments. Using these criteria would make treating the huge number of expected clips be prohibitively time consuming.

Disclosed embodiments include systems and methods for improved classification and generation of IC layouts. Various embodiments include applying a "usefulness" criterion to reduce the set of sub-designs to be processed. Disclosed embodiments include systems and methods that can efficiently obtain all possible IC layout sub-designs (clips), in the form of a matrix of black/white pixels, which satisfy usefulness criteria. Usefulness criteria can be, but are not limited to satisfaction of DRC, uniqueness, and practicality (in an engineering or manufacturing sense).

Uniqueness, as used herein, means no clip can be obtained from another clip by any combination of rotation or reflection operations. In various embodiments, each IC design layout clip may include any number of polygons (zero, one, or more), which may be Manhattan polygons.

To verify uniqueness, as described in more detail below, each clip should be compared with all other clips, which is an $N^2$ operation requiring a prohibitive CPU time for large systems. By grouping the clips into subgroups of similar clips, the system need only compare clips with those in the same subgroup to determine uniqueness. Clips in the same subgroup, in various embodiments, have the same "fingerprint" as described in mode detail below. The fingerprint can include the total number of polygons in the clip, and for each Manhattan polygon, if any, a Manhattan Shape Signature (MSS) that characterizes polygon shape. Classification criteria can include one or more of a total number of polygons in an IC design layout clip, a number of edges of each polygon, the MSS of each polygon, a polygon area of each polygon, a polygon perimeter of each polygon, a ratio of longest edge to shortest edge of each polygon, a minimum distance between each polygon and its clip border, a distance between a center of gravity of each polygon and that of IC design layout clip, or a distance between a center of gravity of pairs of polygons in a IC design layout clip. These classification criteria can also be included in the fingerprint, as can any other rotationally invariant feature. The system can then manufacture an IC according to the final set of IC design layout clips.

Consider an 8×8 pixel clip. The set of all possible black/white patterns contains $2^{(8\times8)}$=2e19 clips. This number is too large to be effectively generated or managed by any typical current computational system. Reducing the set by introducing usefulness criteria as disclosed herein produces a large but manageable number of clips.

Disclosed embodiments include a recursive, biologically inspired layout process, referred to herein as a genealogy driven layout. The process starts with small clips that grow recursively to reach any desired size.

Figure 4A:
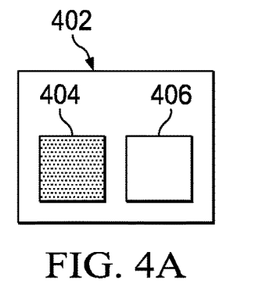
FIGS. 4A-4D illustrate clip generation in accordance with disclosed embodiments.

As used herein, the starting set is referred to as "generation 0," which contains all single-pixel clips. There are only two such clips: a single black pixel clip and a single white pixel clip. FIG. 4A illustrates the generation 0 set 402, including one black pixel clip 404 and one white pixel clip 406.

Figure 4B:
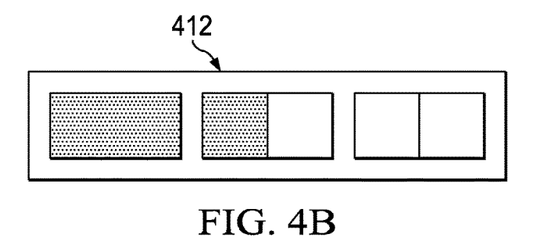

Each generation set may be produced from the members of the previous generation set by combining any two clips in the previous generation. That is, each element of a previous generation may be combined with any (or each) other element of that generation to form the next generation. The next generation set (e.g., generation 1) may be composed of all possible combinations of pairs of elements of the previous generation (e.g., generation 0), provided the new composed element in the next generation set satisfies the application of usefulness criteria. FIG. 4B illustrates the generation 1 set 412, which comprises the three possible combinations 1×2 clips that can be generated from a black pixel clip 404 and a white pixel clip 406. Notice that other combinations, such as placing pixels vertically (e.g., 2×1 clips) or placing a white pixel on the left and a black pixel on the right, were all removed due to uniqueness criterion: they could have all be obtained from remaining elements of that set by rotation/reflection. That is, since the black-left and white-right combination is included in the set, any other combinations of a single black pixel and a single white pixel can be obtained by rotating and/or reflecting the black-left and white-right combination, and so they are removed as non-unique.

Figure 4C:
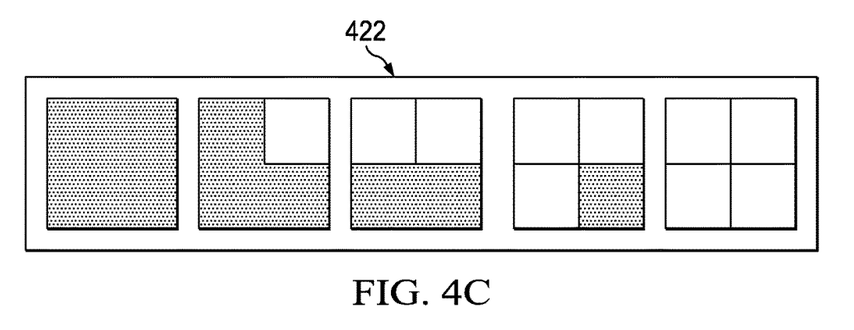
Figure 4D:
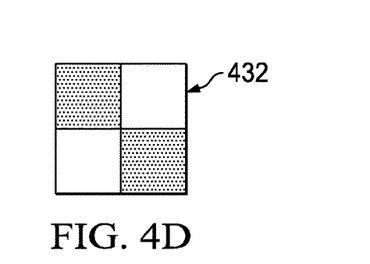

Note that, at each generation, some clips in the set may be eliminated by applying one or more usefulness criteria. FIG. 4C illustrates the generation 2 set 422, of 2×2 clips that can be generated from the generation 1 1×2 clips, but excluding a clip eliminated according to an exemplary, arbitrary design rule by the design rule checker, which can function as one of the usefulness criteria. A design rule checker applies manufacturing "design rules" to the layouts or clips to ensure that they can be successfully manufactured based on their geometries or other features. FIG. 4D illustrates the clip 432 eliminated from set 422 by the arbitrary design rule, which would not then be used to generate subsequent generations, even though it would be a unique combination of pairs of the clips in the generation 1 set.

Note that set 422 also conforms to the uniqueness usefulness criterion, in that none of the 2×2 clips in set 422 is a reflection or rotation of another clip in the set 422. Portions of the clips in each set can be a reflection or rotation of a clip in the previous generation. For example, the bottom half of the fourth clip in set 422 (generation 2) is a reflection of the middle clip in set 412 (generation 1). In FIG. 4C, the uniqueness criterion eliminates any other possible combinations of the generation 1 set 412 that are a reflection and/or rotation of the remaining combinations. For example, there is only one clip of three black pixels and one white pixel in set 422, since all other possible clips of those elements can be obtained by rotating and/or reflecting that clip.

Subsequent generations may be built accordingly, by combining pairs of clips from the parent generation: generation 3 is comprised of 2×4 clips (formed by pairs of 2×2 clips), generation 4 is comprised of 4×4 clips (formed by pairs of 2×4 clips), generation 5 is comprised of 4×8 clips (formed by pairs of 4×4 clips), etc. The combination of the generated generation sets is the "genealogy tree." The set generation may be repeated until the system produces the set of elements of the desired size.

During creation of each new generation, the system verifies that each element does not violate any usefulness criterion. As described above, one of the usefulness criteria can be uniqueness, which would generally require comparison of all generated clips. This comparison is an $N^2$ operation, which can be computationally prohibitive for a large number of elements.

For uniqueness checking, disclosed embodiments may instead apply a classification of created clips based on a technique referred to "fingerprints", which may rely on a concept referred to herein as a "Manhattan Shape Signature," ("MSS") described below. A "Manhattan polygon" may refer to a 2D polygon in which all vertices are right angles (and so may be referred to as "corners") and is composed of only vertical and horizontal edges. In disclosed embodiments, only clips in the same class with respect to the number of N-corners (as described below) are compared, which significantly reduces processing time.

Manhattan polygons are considered herein in a topological sense, i.e., regardless of the length of each edge or any rotation or reflection of the whole polygon. Two Manhattan polygons are topologically different if it is impossible to transform one to the other by changing edge lengths, rotation, and/or reflection.

Special care should be made for the treatment of multiply connected polygons, i.e. polygons having one or more holes. They can also be described as polygons having more than one set of consecutive edges and corners, one of them concerns the external containing polygon, all other sets represent the holes within the external polygon. Multiply-connected polygons are not excluded but can be transformed to a simply-connected polygon for classification by MSS. A multiply connected polygon can be transformed into simply connected by making the usual artificial cut to connect interior and exterior shapes, and the resulting polygon would be simply connected. In this case, edges and corners of the polygon (including the holes) will all be connected in one continuous series.

Figure 5:
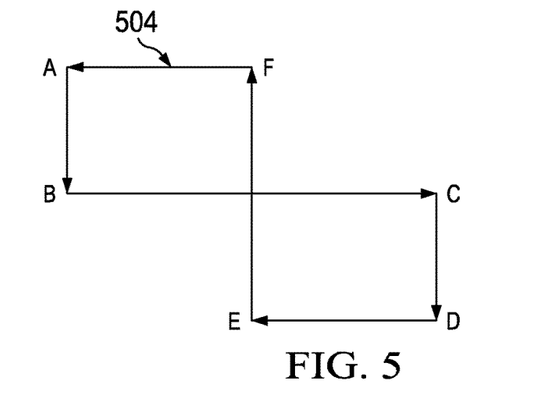
FIG. 5 illustrates excluded polygons in accordance with disclosed embodiments.

FIG. 5 illustrates a polygon 504 in which edges cross each other, and so is excluded from the MSS classification process. Polygons classified as described herein have edges that never cross each other as where BC crosses EF in FIG. 5. In processes as described herein, polygon edges should only meet at when forming a corner. The polygon 504 ABCDEF can never occur in real designs due to violation of DRC at the intersection of edges BC and EF, and so would also be removed in the clip generation process described above as violating DRC.

Figure 6:
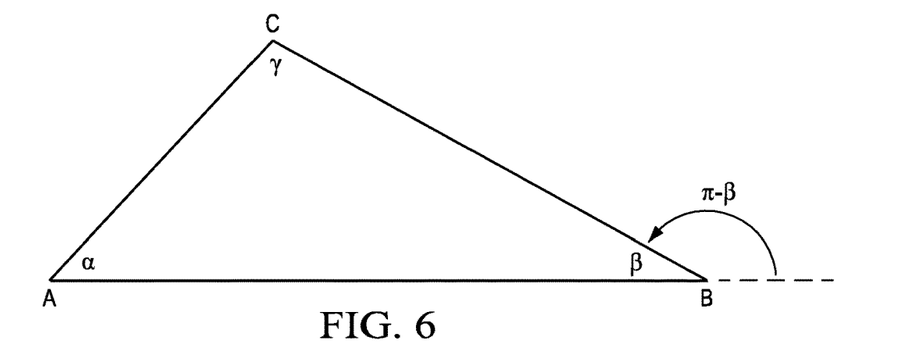
FIG. 6 illustrates simple polygon in accordance with disclosed embodiments.
Figure 7:
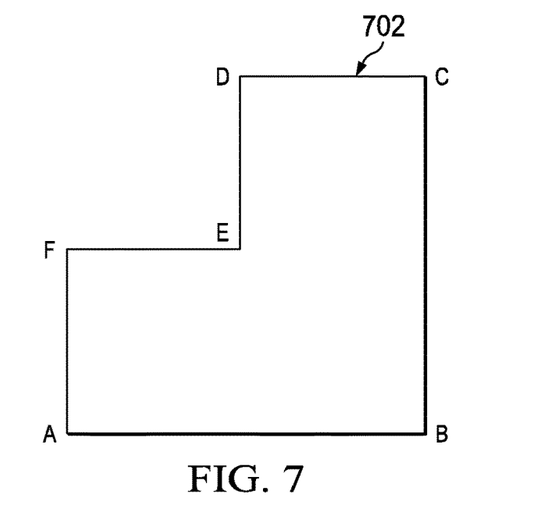
FIG. 7 illustrates an exemplary Manhattan polygon in accordance with disclosed embodiments.

By convention, without any loss of generality, angles are considered positive in the counterclockwise direction. For purposes of illustration, consider polygon edges as rectilinear intersecting "roads" forming a cyclic path. FIG. 6 illustrates the simplest polygon, the triangle, as a first example, despite the fact it is not a Manhattan polygon (since the vertices are not all straight corners). Triangle ABC in FIG. 6 has vertex angles $\alpha$, $\beta$, and $\gamma$, respectively. A "vehicle" starting a trip somewhere on the edge AB will turn by an angle $\pi$-$\beta$ at vertex B. When the vehicle reaches back its initial position, it would have turned a total angle of $(\pi-\alpha)+(\pi-\beta)+(\pi-\gamma)$. This should be equal to $2\pi$, which is the case because the sum of triangle angles is $\pi$ The simplest Manhattan polygon is the rectangle. The sum of angles of a rectangle is $4*(\pi/2)=2\pi$. FIG. 7 illustrates an exemplary Manhattan polygon 702 ABCDEF. All corners, except E, will give rise to a rotation of $+\pi/2$ (that is, 90° as a right angle). Corner E gives rise to a rotation of $-\pi/2$. Corner E is labelled as N-corner (from "Negative"). All other corners are labelled as P-corners (from positive). Note that changing sign convention for rotation angles will still give the same label for each corner, since polygon traversal order will be also reversed.

The only possible way to increase the number of polygon corners is to add pairs of corners: an N-corner and a P-corner, to keep the total sum of angles as $2\pi$. According to disclosed embodiments, Manhattan polygons will first be classified by the number of N-corners. If this number was n, say, the polygon will be called an Nn-polygon; for example, a Manhattan polygon with 1 N-Corner, as in FIG. 7, can be called an N1-polygon. The total number of corners, C, therefore, must be C=2n+4. Therefore, the total number of edges is also C, which must be even. In fact, in a Manhattan polygon as discussed herein, there are an equal number of horizontal edges and vertical edges.

For the same number of N-corners, there can be many possible sequences of N-corners and P-corners. To simplify ordering, disclosed embodiments use an N-corner, if present, as the first corner in a polygon. This does not represent a restriction, since corner sequence is cyclic.

The distinction between two topologically different Manhattan polygons is the sequence of N and P corners that form each Manhattan polygon. A graphical representation of a sequence of corners can be a sequence of colored objects or other visual indicators. For example, using colors, P-corners can be green, N-corners can be yellow, except the first one which can be red.

For classification purposes, the system can denote each Manhattan polygon sequence by the symbol $G_{i,j}$ where i is the number of N-corners and j is a serial number.

Figure 8A:
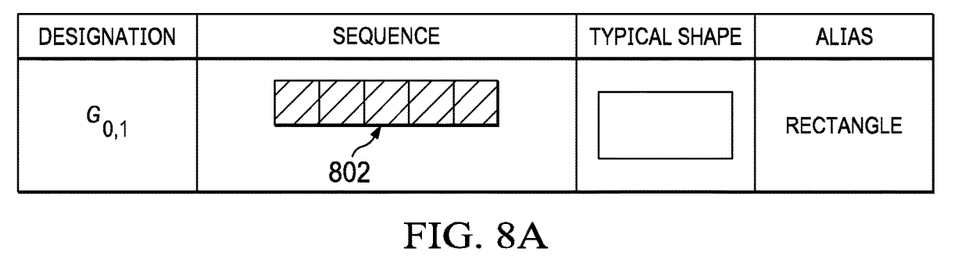
FIGS. 8A-8C illustrate topological Manhattan polygons using a sequence of corners in accordance with disclosed embodiments.
Figure 8B:
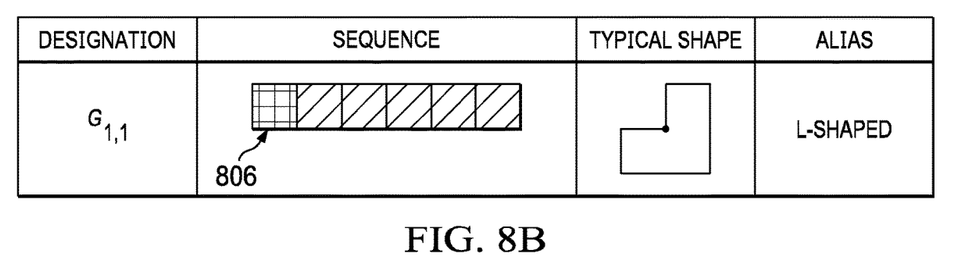
Figure 8C:
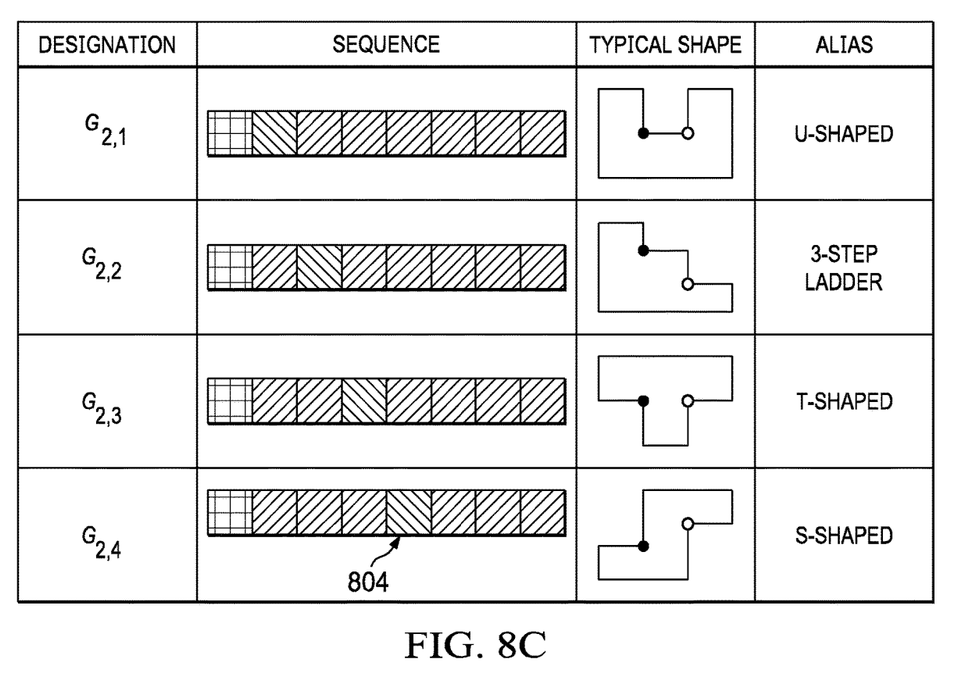

FIGS. 8A-8C illustrate topological Manhattan polygons using a sequence of corners, where P corners use a first fill pattern (as at 802), N corners use a second fill pattern (as at 804), and the first N corner uses a third fill pattern (as at 806).

FIG. 8A illustrates the only possible N0-polygon: $G_{0,1}$: the rectangle.

FIG. 8B illustrates the only possible N1-polygon: $G_{1,1}$: the L shaped polygon.

FIG. 8C illustrates the four possible N2-polygons, $G_{2,1}$ (U-shaped), $G_{2,2}$ (3-step ladder), $G_{2,3}$ (T-shaped), and $G_{2,4}$ (S-shaped).

Due to the cyclic nature of the corner sequence, cases where the second N-corner was at the 6th to 8th position are disregarded. For example, the case where the second N-corner is at the 6th position would have been equivalent to the $G_{2,3}$ sequence given above, by cyclic shift (in this example, cycling the sixth position to the first position, so that the first position cycles to the fourth position).

Disclosed embodiments can also represent a Manhattan polygon sequence using a second approach, in the form of a sequence of n integers (n being the number of N-corners), where each integer represents the number of contiguous P-corners between two N-corners. For instance, in an N2-polygon, there are a total of six P-corners. They are grouped into 2 clusters. Hence, the only 4 possible distributions are, in the same order as in FIG. 8C above: (0,6), (1,5), (2,4) and (3,3). That is, in the G2,1 case, there are zero P-corners between the N-corners in the first and second positions, then six P-corners between the N-corner in the second position and the (cyclically following) N-corner in the first position, resulting in (0,6). The sequence (4,2) is disregarded because it is the same as (2,4), due to the cyclic nature of corner sequences.

In general, for an Nn-polygon, there are a total of n+4 P-corners that are divided into n clusters. One or more cluster(s) can be empty, i.e., containing 0 P-corners.

For instance, there are only eight topologically-different N3-polygons, $G_{3,1}$ to $G_{3,8}$, namely: (0,0,7), (0,1,6), (0,2,5), (0,3,4), (1,1,5), (1,2,4), (1,3,3), (2,2,3).

Any other sequence can be obtained from one of the above sequences by cyclic or anti-cyclic permutation. Notice that the total number of topologically different Manhattan polygons of any order is rather small.

As is clear, for a finite 2D-space clip, where the edge length of polygons has a minimum value, dictated by DRC, as in any actual design layout, there is an upper limit to n, the number of N-corners in a polygon, that can fit in a clip. The set $G_{i,j}$ is hence finite and relatively small, and can be compared to "characters" in an alphabet. The set of all possible 'character' combinations, regardless of the number of repetitions of any character in a combination, that can fit in the clip is also finite with a relatively small number of elements. This being the case, the sequence itself can be used to classify each clip.

As described above, a polygon shape can be described topologically (i.e., regardless of physical dimension) by the sequence of convex/concave vertices ordered by clockwise or counterclockwise traversal of the polygon. Any cyclic or anti-cyclic permutation of this sequence is considered as the same sequence, which becomes the Manhattan shape signature. The total number of different Manhattan polygon topologies, described by different sequences, for the same total number of edges, is a finite number. The system therefore can associate any given shape with a unique and finite size code as its MSS.

As described above, for a given number of total edges in a Manhattan polygon, there are only a finite number of different Manhattan polygon topologies. The only four possible Manhattan Shape Signatures for an eight-edge (N2) Manhattan polygon, are shown in FIG. 8C, described below. While these polygons could be rotated or scaled, or any specific edges could be of different dimensions in different implementations, the MSS would be the same as one of those illustrated, since only four different MSSs are possible for an eight-edge (N2) Manhattan polygon.

The MSS is a topological criterion. It defines polygon shape (e.g. a "U", a "T" or a "L" shaped polygon) regardless of any dimension or any rotation/reflection. It can be obtained by the system through a single traversal of polygon vertices expressed in a vector form (or any other form in which polygon vertices and/or edges are expressed). In the same or different traversal, the system can also determine many other dimensional characteristic values, rendering the description of a specific Manhattan polygon almost complete. All topological and dimensional criteria are generally rotation/reflection invariant in that these criteria are consistent to a given polygon and its shape regardless of whether the shape is reflected or rotated.

The system can use a combination of these fields to produce a unique code for each "fingerprint" that characterizes a classified category of clips. Categories can be stored in a balanced tree, ordered by its fingerprint to facilitate searching.

Classification criteria can include, but are not limited to, the number of polygons and, when there is more than one polygon, the distance between the center of gravity of any pair of polygons. For any given polygon, the classification criteria can include such characteristics as the number of edges, the convex/concave vertices sequence (e.g., a Manhattan Shape Signature), the polygon area, the polygon perimeter, the ratio of longest edge to shortest edge, the minimum distance between the polygon and its clip border, and the distance between the polygon's center of gravity and its clip's geometric center, as but some examples. If the polygon is multiply connected, the classification criteria can be either applied to the polygon with cuts or to the set composed of the external polygon as well as any internal polygons.

Applying usefulness criteria as each generation is produced provides a significant advantage in that only those clips satisfying the usefulness criteria are created. Clips violating usefulness criteria are not generated (eliminated) as early as possible in the generation process so that they are not included in any subsequent generations, avoiding the unnecessary and wasteful process of producing new generations of not-useful clips. This may considerably reduce both the storage space and the processing time required in the clip generation process.

Reproduction by using each "parent" clip to produce their "children" clips may provide another significant advantage. Clips can be grouped by common ancestor clips, that is, the set of clips descended from a specific prior-generation ancestor clip. This provides an additional useful classification of all possible useful clips. Moreover, if a given faulty feature is identified in a clip, then this feature is typically present in its ancestors until a certain level in the genealogy tree. Identifying all other clips having this feature is quite simple by listing all descendants of the common ancestor. The data identifying the "ancestry" of each clip is referred to herein as "clip ancestor data."

Disclosed embodiments can exploit the vector representation of a clip to enable meaningful discrimination criteria that can be efficiently calculated for each clip given its fingerprint. The system can organize the very large set of clips to be compared based on their fingerprint. Pattern matching is therefore computationally simple and straightforward. The number of comparison operations is thus significantly reduced by limiting it to comparing only "similar" designs—i.e., those having the same fingerprint. Without this feature, producing each new generation and applying uniqueness criteria would have required a prohibitive CPU time.

Figure 9:
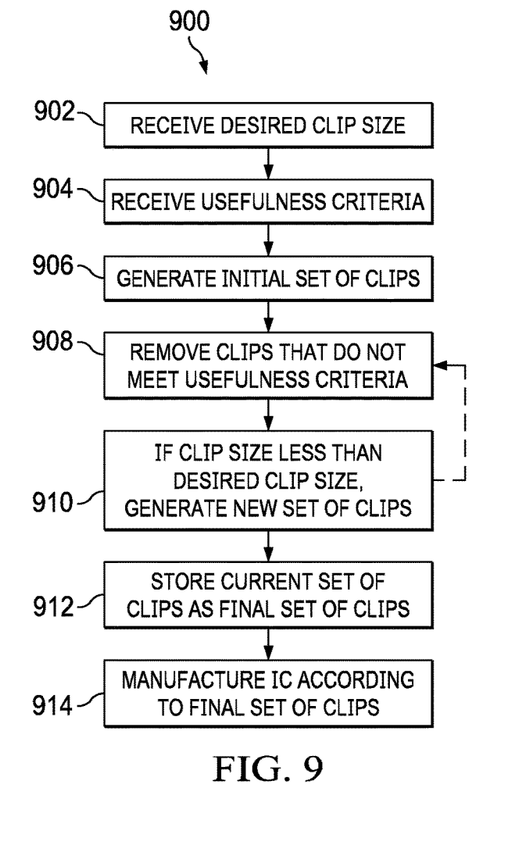
FIGS. 9 and 10 illustrate processes in accordance with disclosed embodiments.

FIG. 9 illustrates a process 900 in accordance with disclosed embodiments that can be performed by one or more computer systems as disclosed herein, referred to generically as the "system," to generate a set of IC design layout clips.

The system receives a desired clip size (902). "Receiving," as used in this process, can include loading from storage, receiving from another device or process, receiving via an interaction with a user, and otherwise.

The system receives one or more usefulness criteria (904). The usefulness criteria can include satisfaction of design rule checker requirements, uniqueness, and engineering or manufacturing practicality, or other criteria. Of course, other embodiments may use a different label for similar requirements than "usefulness" criteria.

The system generates an initial set of integrated circuit (IC) design layout clips (906). By default, the initial set contains only two clips, each composed of a single pixel. One of them being black, the other being white (or using comparable designations), which mimics an original-ancestor pair in this approach. In various embodiments, all IC design layout clips may contain Manhattan polygons.

The system removes any IC design layout clips from the current set of IC design layout clips that do not meet the one or more usefulness criteria (908). This step can include performing classification process as described herein to remove non-unique IC design layout clips when the usefulness criteria includes a uniqueness requirement.

While the size of the IC design layout clips is less than the desired clip size, the system generates a new set of IC design layout clips from the current set of IC design layout clips according to every combination of pairs of the design layout clips in the current set of IC design layout clips (910), including every possible rotation/reflection before combination. The current set acts as "parents," and each of the clips in the new set can be considered a "child." The system can store the history of each clip created, e.g., clip ancestor data that includes some or all parents and ancestors used to create the clip, for further analysis. Because the previous current set has already been filtered by the usefulness criteria, no unnecessary new "child" clips are generated from parent clips that fail the usefulness criteria, since those un-generated child clips would otherwise have to be tested against and would then fail the usefulness criteria.

The process repeats to 908 to filter the new, larger set of IC design layout clips. The new set will be considered as the new current set when repeating these actions.

When the size of the IC design layout clips is not less than the desired clip size, and the current set of IC design layout clips has been filtered at 908, the system can store the current set of IC design layout clips as a final set of IC design layout clips (912). The final set can represent all possible IC design layout clips satisfying the usefulness criteria and of the prespecified size.

The system can thereafter manufacture an IC according to the final set of IC design layout clips (914).

Figure 10:
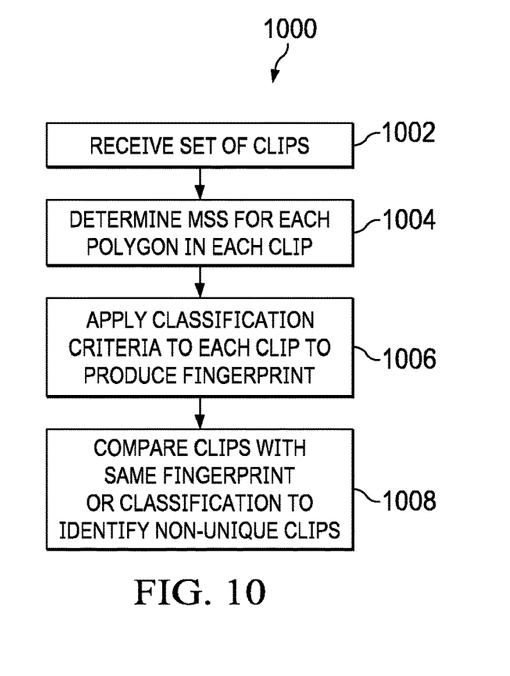

FIG. 10 illustrates a process 1000 in accordance with disclosed embodiments, which can be used as part of step 908 referred to above in FIG. 9 with regard to evaluating uniqueness criteria. It can be performed by one or more computer systems as disclosed herein, referred to generically as the "system," to classify each IC design layout clip in a set of IC design layout clips, and to test each IC design layout clip in a set of IC design layout clips for uniqueness.

The system receives a set of IC design layout clips (1002). Each IC design layout clip in the set of IC design layout clips is composed of a set of one or more polygons, where each polygon may be a Manhattan polygon.

For each polygon in each IC design layout clip in the set of IC design layout clips, if the polygon was a Manhattan polygon, the system determines a Manhattan shape signature (MSS) as described herein (1004). The system can store the MSS for each polygon in each IC design layout clip in the set of IC design layout clips in a balanced tree or other dynamic data structure.

The system applies classification criteria to each IC design layout clip in the set of IC design layout clips to assign a classification to each IC design layout clip in the set of IC design layout clips and produce a corresponding fingerprint (1006). The classification criteria can include the number of polygons in the IC design layout clip, and for each polygon, its MSS, its number of edges, its area, its perimeter, the ratio of longest edge to shortest edge, the minimum distance between the polygon and its clip border and the distance between the polygon's center of gravity and the geometric center of the IC design layout clip, or any combination of these. In cases where more than one polygon are present, classification may also include the distance between the center of gravity of each pair of polygons. The classification can be transformed into a unique number (e.g., the "fingerprint"), which can be stored with or associated with each corresponding IC design layout clip in the set of IC design layout clips in a balanced tree or other data structure. The fingerprint may also include any other rotationally invariant feature, in addition to or other than those mentioned above.

The system can compare each pair of clips having the same classification or corresponding fingerprint in the set of IC design layout clips to identify non-unique IC design layout clips (1008). Non-unique IC design layout clips can be considered to not meet the one or more usefulness criteria when the usefulness criteria include uniqueness. The system only needs to compare each pair of IC design layout clip in the same category resulting from above classification to identify the non-unique IC design layout clips, since this is sufficient to identify any non-unique IC design layout clips. That is, the classification or fingerprint effectively groups similar clips, and only those similar clips need to be compared for uniqueness, rather than comparing every clip with all other clips.

Figure 11:
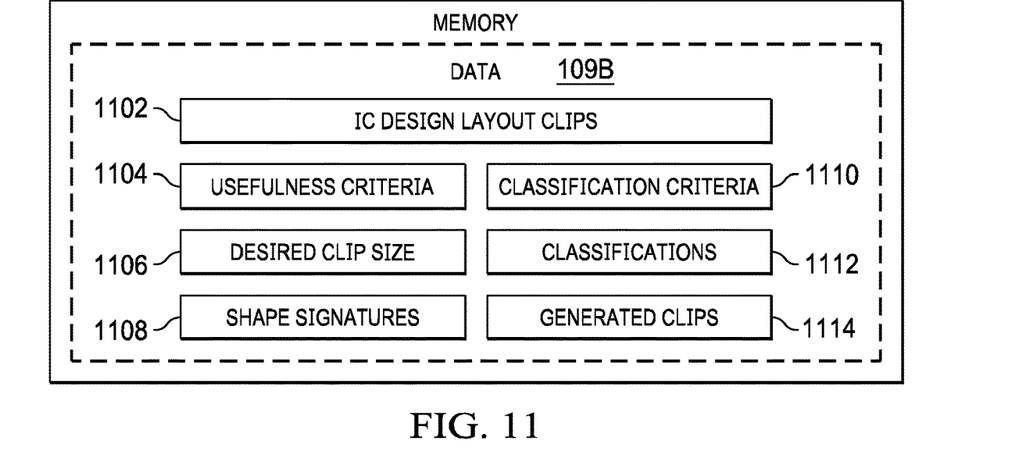
FIG. 11 illustrates examples of data usable for performing processes as described herein.

As described above with respect to FIG. 1, the data 109B usable for performing processes described herein can be stored in memory 107. FIG. 11 illustrates examples of data usable for performing processes as described herein. This data includes IC design layout clips 1102, usefulness criteria 1104, desired clip size 1106, shape signatures 1108, classification criteria 1110, and classifications 1112. The data can also include generated clips 1114, which can include clips generated in the previous generation that are needed to generate the current generation. Any other data described herein can also be stored as data 109B.

In disclosed processes, for any given set of usefulness criteria and final clip size, the output is unique and repeatable. The system can effectively compare two very large sets and check rapidly if they are identical to determine if the same process, criteria, and final clip size were used.

Note that, while the processes described above combine a clip generation process and a classification process, these processes are not dependent or necessary for each other. The clip generation processes described herein can use other techniques for classification or uniqueness checking, and the MSS classification processes described herein can be used with other clip generation processes or any sets of patterns to be classified.

Various disclosed embodiments include systems and methods for generating a set of IC design layout clips. A method includes generating an initial set of integrated circuit (IC) design layout clips as a current set of IC design layout clips. The method includes removing any of IC design layout clips from the current set of IC design layout clips that do not meet the one or more usefulness criteria. The method includes, while a size of the IC design layout clips is less than a desired clip size, generating a new set of IC design layout clips, viewed as children, from the current set of IC design layout clips, viewed as parents, through combination of each couple of parents. The new set of IC design layout clips will be considered as the current set before repeating the removing process. The method includes, when the size of the IC design layout clips is not less than the desired clip size, storing the current set of IC design layout clips as a final set of IC design layout clips. The method includes keeping track of the history of each created clip at any stage so that all clips used to create it are known for further analysis.

Another method, for generating all possible IC design layout clips satisfying usefulness criteria, as described herein of a prespecified size. The method includes generating an initial set of integrated circuit (IC) design layout clips as a current set of IC design layout clips. The method includes removing any of IC design layout clips from the current set of IC design layout clips that do not meet the one or more usefulness criteria. The method includes, while a size of the IC design layout clips is less than a desired clip size, generating a new set of "children" IC design layout clips from the current set of "parents" IC design layout clips through every combination of any pair or couple of "parent" design layout clips in the current set of IC design layout clips, including all possible rotations/reflections before combination, relabeling or considering the new set of IC design layout clips as the current set of IC design layout clips, and repeating the removing process. The method includes, when the size of the IC design layout clips is not less than the desired clip size, storing the current set of IC design layout clips as a final set of IC design layout clips, which can represent all possible IC design layout clips satisfying usefulness criteria and of prespecified size. The method can include keeping track of all clip ancestor data, including its parents and ancestors (or otherwise tracking the genealogy of each created clip), at any stage so that all clips used to create it are known for further analysis.

In various embodiments, the usefulness criteria can include one or more of satisfaction of design rule checker requirements, uniqueness, and engineering or manufacturing practicality. In various embodiments, the usefulness criteria include uniqueness, which means no clip can be obtained from another clip by rotation or reflection operations.

The following documents describe other related issues, and are hereby incorporated by reference:

Design Layout Analysis and DFM Optimization using Topological Patterns, Ji Xu et al., Proc. of SPIE Vol. 9427, 94270Q•(2015).

Design space exploration for early identification of yield limiting patterns, Proc. of SPIE Vol. 9781 97810 W-1.

Minimizing Cluster Number with Clip Shifting in Hotspot Pattern Classification, DAC '17, Jun. 18-22, 2017, Austin, Tex., USA.

MapReduce-Based Pattern classification for Design Space Analysis, 2018 International Symposium on VLSI Design, Automation and Test (VLSI-DAT).

Pattern Similarity Metrics for Layout Pattern Classification and their Validity Analysis by Lithographic Responses, 2018 IEEE Computer Society Annual Symposium on VLSI.

Those skilled in the art will recognize that, for simplicity and clarity, the full structure and operation of all data processing systems suitable for use with the present disclosure are not being depicted or described herein. Instead, only so much of a data processing system or computer system as are unique to the present disclosure or necessary for an understanding of the present disclosure are depicted and described. The remainder of the construction and operation of the data processing system may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle. The use of terms such as (but not limited to) "mechanism," "module," "device," "unit," "component," "element," "member," "apparatus," "machine," "system," "processor," or "controller," within a claim is understood and intended to refer to structures known to those skilled in the relevant art, as further modified or enhanced by the features of the claims themselves, and is not intended to invoke 35 U.S.C. § 112(f).

What is claimed is:

1. A method performed by a computer system, comprising:
   generating an initial set of integrated circuit (IC) design layout clips as a current set of IC design layout clips, wherein an IC design layout clip comprises a building block of a specified size for an IC design;
   removing any of the IC design layout clips from the current set of IC design layout clips that do not meet the one or more usefulness criteria, wherein the usefulness criteria include uniqueness such that a given IC design layout clip from the current set of CI deign layout clips cannot be obtained from another IC design layout clip from the current set of IC design layout clips by any combination of rotation or reflection operations, wherein each IC design layout clip includes one or more polygons, and wherein, to determine the any of the IC design layout clips from the current set of IC design layout clips that do not meet the one or more usefulness criteria, the computer system:
      determines a Manhattan shape signature (MSS) for each Manhattan polygon in each IC design layout clip in the current set of IC design layout clips;
      applies classification criteria to each IC design layout clip in the set of IC design layout clips to produce a fingerprint corresponding to each IC design layout clip in the set of IC design layout clips; and
      only compares each pair of clips having a same corresponding fingerprint to identify non-unique IC design layout clips; and
   when a size of the IC design layout clips is less than a desired clip size, generating a new set of IC design layout clips from the current set of IC design layout clips according to every combination of pairs of the design layout clips in the current set of IC design layout clips, including all possible rotations or reflections before combination, relabeling the new set of IC design layout clips as the current set of IC design layout clips, and repeating the removing process; and
   when the size of the IC design layout clips is not less than the desired clip size, storing the current set of IC design layout clips as a final set of all possible IC design layout clips, or any part of all possible IC design layout clips, satisfying the one or more usefulness criteria and of the desired clip size, and storing clip ancestor data for each of the IC design layout clips in the final set of IC design layout clips.

2. The method of claim 1, wherein the usefulness criteria further include one or more of satisfaction of design rule checker requirements and engineering or manufacturing practicality.

3. The method of claim 1, wherein the classification criteria include one or more of a total number of polygons in an IC design layout clip, a number of edges of each polygon, the MSS of each Manhattan polygon, a polygon area of each polygon, a polygon perimeter of each polygon, a ratio of longest edge to shortest edge of each polygon, a minimum distance between each polygon and its clip border, a distance between a center of gravity of each polygon and its IC design layout clip, or a distance between a center of gravity of pairs of polygons in a IC design layout clip.

4. The method of claim 1, further comprising thereafter manufacturing an IC according to the final set of IC design layout clips.

5. The method of claim 1, further comprising receiving the desired clip size or receiving the one or more usefulness criteria.

6. A computer system comprising:
   a processor; and
   an accessible memory, the computer system configured to:
      generate an initial set of integrated circuit (IC) design layout clips as a current set of IC design layout clip, wherein an IC design layout clip comprises a building block of a specified size for an IC design;
      remove any of the IC design layout clips from the current set of IC design layout clips that do not meet the one or more usefulness criteria, wherein the usefulness criteria include uniqueness such that a given IC design layout clip from the current set of CI deign layout clips cannot be obtained from another IC design layout clip from the current set of IC design layout clips by any combination of rotation or reflection operations, wherein each IC design layout clip includes one or more polygons, and wherein, to determine the any of the IC design layout clips from the current set of IC design layout clips that do not meet the one or more usefulness criteria, the computer system:
         determines a Manhattan shape signature (MSS) for each Manhattan polygon in each IC design layout clip in the current set of IC design layout clips;
         applies classification criteria to each IC design layout clip in the set of IC design layout clips to produce a fingerprint corresponding to each IC design layout clip in the set of IC design layout clips; and
         only compares each pair of clips having a same corresponding fingerprint to identify non-unique IC design layout clips; and
      when a size of the IC design layout clips is less than a desired clip size, generate a new set of IC design layout clips from the current set of IC design layout clips according to every combination of pairs of the design layout clips in the current set of IC design layout clips, and repeat the removing process; and
      when the size of the IC design layout clips is not less than the desired clip size, store the current set of IC design layout clips as a final set of IC design layout clips.

7. The computer system of claim 6, wherein the usefulness criteria further include one or more of satisfaction of design rule checker requirements and engineering or manufacturing practicality.

8. The computer system of claim 6, wherein the classification criteria includes one or more of a total number of polygons in an IC design layout clip, a number of edges of each polygon, the MSS of each polygon, a polygon area of each polygon, a polygon perimeter of each polygon, a ratio of longest edge to shortest edge of each polygon, a minimum distance between each polygon and its clip border, a distance between a center of gravity of each polygon and its IC design layout clip, or a distance between a center of gravity of pairs of polygons in a IC design layout clip.

9. The computer system of claim 6, wherein the computer system is further configured to thereafter manufacture an IC according to the final set of IC design layout clips.

10. The computer system of claim 6, wherein the computer system is further configured to receive the desired clip size or receive the one or more usefulness criteria.

11. A non-transitory computer-readable medium storing executable instructions that, when executed, cause one or more computer systems to:
- generate an initial set of integrated circuit (IC) design layout clips as a current set of IC design layout clips, wherein an IC design layout clip comprises a building block of a specified size for an IC design;
- remove any of the IC design layout clips from the current set of IC design layout clips that do not meet the one or more usefulness criteria, wherein the usefulness criteria include uniqueness such that a given IC design layout clip from the current set of CI deign layout clips cannot be obtained from another IC design layout clip from the current set of IC design layout clips by any combination of rotation or reflection operations, wherein each IC design layout clip includes one or more polygons, and wherein, to determine the any of the IC design layout clips from the current set of IC design layout clips that do not meet the one or more usefulness criteria, the non-transitory computer-readable medium further stores executable instructions that, when executed, cause the one or more computer systems to:
  - determine a Manhattan shape signature (MSS) for each Manhattan polygon in each IC design layout clip in the current set of IC design layout clips;
  - apply classification criteria to each IC design layout clip in the set of IC design layout clips to produce a fingerprint corresponding to each IC design layout clip in the set of IC design layout clips; and
  - compare clips having a same corresponding fingerprint to identify non-unique IC design layout clips; and
- when a size of the IC design layout clips is less than a desired clip size, generate a new set of IC design layout clips from the current set of IC design layout clips according to every combination of pairs of the design layout clips in the current set of IC design layout clips, and repeat the removing process; and
- when the size of the IC design layout clips is not less than the desired clip size, store the current set of IC design layout clips as a final set of IC design layout clips.

12. The non-transitory computer-readable medium of claim 11, wherein the usefulness criteria further include one or more of satisfaction of design rule checker requirements and engineering or manufacturing practicality.

13. The non-transitory computer-readable medium of claim 11, wherein the classification criteria includes one or more of a total number of polygons in an IC design layout clip, a number of edges of each polygon, the MSS of each polygon, a polygon area of each polygon, a polygon perimeter of each polygon, a ratio of longest edge to shortest edge of each polygon, a minimum distance between each polygon and its clip border, a distance between a center of gravity of each polygon and its IC design layout clip, or a distance between a center of gravity of pairs of polygons in a IC design layout clip.

14. The non-transitory computer-readable medium of claim 11, further storing executable instructions that, when executed, cause the one or more computer systems to thereafter manufacture an IC according to the final set of IC design layout clips.

\* \* \* \* \*